United States Patent [19]

Baer

[11] Patent Number: 5,284,311
[45] Date of Patent: Feb. 8, 1994

[54] HOOK BRACKET AND KIT FOR STORAGE STRUCTURE

[75] Inventor: Thomas R. Baer, Edgerton, Wis.

[73] Assignee: Newco, Inc., Janesville, Wis.

[21] Appl. No.: 871,911

[22] Filed: Apr. 21, 1992

Related U.S. Application Data

[63] Continuation of Ser. No. 605,530, Oct. 29, 1990, abandoned.

[51] Int. Cl.$^5$ .............................................. A47G 29/02
[52] U.S. Cl. .................................. 248/243; 248/222.2; 248/247; 5/296; 211/191; 403/381; 403/254
[58] Field of Search .................. 248/223.4, 243, 225.2, 248/220.2, 219.3, 201; 211/191, 187; 108/107, 114; 5/296; 403/232.1, 381, 254, 263

[56] References Cited

U.S. PATENT DOCUMENTS

| | | | |
|---|---|---|---|
| 549,128 | 11/1895 | Hart | 5/296 |
| 1,320,969 | 11/1919 | Beadle | 5/296 |
| 2,160,174 | 5/1939 | Scalera | 5/296 |
| 2,311,537 | 2/1943 | Giuseffi | 5/296 |
| 2,450,723 | 10/1948 | Elrad | 5/296 |
| 2,528,358 | 10/1950 | Grass | 248/222.2 X |
| 2,707,788 | 5/1955 | Ball | 5/296 |
| 2,911,690 | 11/1959 | Sanford | 248/214 |
| 2,925,920 | 2/1960 | Skubic | 211/191 X |
| 3,044,633 | 7/1962 | Baker, Jr. | 211/191 |
| 3,113,996 | 12/1963 | Sanford | 248/222.2 X |
| 3,170,217 | 2/1965 | Williams | 248/214 |
| 3,278,149 | 10/1966 | Brucker | 248/243 |
| 3,298,646 | 1/1967 | Burgen, Jr. | 248/903 X |
| 3,471,112 | 10/1969 | MacDonald et al. | 248/243 |
| 3,494,480 | 2/1970 | Cassel | 211/191 |
| 3,637,086 | 1/1972 | Klein | 5/296 X |
| 3,784,025 | 1/1974 | Dumit | 248/243 X |
| 3,814,034 | 6/1974 | Seiz | 108/111 |
| 3,993,002 | 11/1976 | Stroh | 108/108 |
| 4,019,298 | 4/1977 | Johnson IV | 403/381 X |
| 4,180,003 | 12/1979 | Clement | 108/144 |
| 4,189,796 | 2/1980 | Gutner | 5/8 |
| 4,324,379 | 4/1982 | Ovitz, III | 248/243 X |
| 4,421,239 | 12/1983 | Vargo | 211/187 |
| 4,536,904 | 8/1985 | Whitehead | 5/201 |
| 4,553,725 | 11/1985 | Vargo | 248/221.3 |
| 4,592,286 | 6/1986 | Trubiano | 211/187 X |
| 4,669,692 | 6/1987 | Mastrodicasa | 248/250 |
| 4,711,183 | 12/1987 | Handler et al. | 108/111 |
| 4,856,746 | 8/1989 | Wrobel et al. | 248/250 |
| 4,996,929 | 3/1991 | Saal | 108/107 |
| 5,004,369 | 4/1991 | Young | 403/232.1 |

FOREIGN PATENT DOCUMENTS

| | | | |
|---|---|---|---|
| 5810098 | 7/1933 | Fed. Rep. of Germany | 5/296 |
| 470147 | 8/1914 | France | 5/296 |

Primary Examiner—Ramon O. Ramirez
Assistant Examiner—Korie H. Chan
Attorney, Agent, or Firm—Lathrop & Clark

[57] ABSTRACT

A bracket for adjustably mounting a timber member on a rack is disclosed which has a U-shaped band with two vertical arms joined by a horizontal base, with each arm having a fastener hole to permit rigid fastening of a timber member within the arms of the band. An L-shaped hook extends outwardly from one arm and is in substantially the same plane as the arm. The hook is adapted to engage within a slot in a vertically mounted rack. An end plate is preferably attached to the band perpendicular to the band so as to resist movement of the timber member within the band parallel to the arms and in the direction of the hooks. The hook preferably has a portion adapted to engage in the slot in the rack which is tapered so as to permit a wedging of the hook into the slot. A kit for the assembly of timber members into a structural frame of this invention comprises a rack with a plurality of vertically spaced slots with fastener openings to permit mounting the racks to the face of a timber beam and a hook bracket. Frame structures may be assembled from the kit by mounting hook brackets with leftwardly and rightwardly extending hooks on opposite ends of a horizontal timber member and engaging the hooks within slots of racks mounted to vertical timber members. Common structural frames such as shelves and workbenches may be constructed from the hardware of this invention.

12 Claims, 6 Drawing Sheets

HOOK BRACKET AND KIT FOR STORAGE STRUCTURE

CROSS-REFERENCES TO RELATED APPLICATIONS

This is a continuation of application Ser. No. 07/605,530 filed Oct. 29, 1990 now abandoned.

FIELD OF THE INVENTION

This invention relates to hardware for adjustably connecting horizontal timbers to vertical timbers in general and to hardware for assembling shelf and bench support structures in particular.

BACKGROUND OF THE INVENTION

Adjustable shelving structures are used to store a variety of equipment and materials i a compact and organized fashion. As the storage needs of the business or home user of the shelving changes, the positioning of the shelves may be adjusted.

One type of adjustable shelf structure has horizontal shelves with protruding hooks which engage slots in vertically mounted racks. Such cantilevered structures can support only light loads. Hook and rack structures may be fabricated entirely of metal however, all-metal shelving structures which are sturdy enough to support heavy loads may be costly to manufacture and ship because of the great weight of the metal components.

What is needed is an assembly of hardware parts that would enable the fabrication of shelving structures from easily available dimensions of timber which could be assembled with minimal skill yet which would be sturdy enough to support heavy loads.

SUMMARY OF THE INVENTION

The hook bracket for adjustably mounting a timber member on an upright slotted rack of this invention has a U-shaped band with two vertical arms adapted to be fastened to and lie along opposed surfaces of a horizontal timber member, the arms each lying substantially in the plane of the adjacent surfaces of the attached timber member. The arms are joined by a horizontal base, the horizontal base underlying a lower surface of an attached timber member in supporting relation. Each arm has a portion defining a fastener hole which permits penetration by rigid fasteners substantially perpendicular to the plane of the vertical arm for the purpose of rigidly fastening a timber member within the arms of the bracket. An L-shaped hook extends outwardly and downwardly from one arm and is in substantially the same plane as the arm. The hook is adapted to engage in a slot in the rack to support the timber member in fixed relation to the rack. A Preferred form of the bracket has an end plate attached to the band Perpendicular to the band so as to resist movement of the timber member parallel to the arms and in the direction of the hook. The bracket hook has a portion adapted to engage a slot in the rack which is preferably of increasing thickness so as to permit a wedging of the hook into the slot.

A kit for assembling timber members into a support structure has at least two hook brackets and two racks having a plurality of vertically spaced slots with fastener openings to permit the mounting of the rack to the face of a timber beam. The kit may also have a metallic cross bracing for bracing vertical timber beams against one another. Additionally, the kits may have brace beams tying the vertical timbers together. A frame structure utilizing the hardware kit of this invention has four vertical timber members positioned at the corners of a rectangle and racks having a plurality of vertically spaced slots. A rack is mounted to a vertical face of each upright member to form two pairs of racks. The frame structure has two horizontal timber members and four hook brackets. The hook brackets are mounted to the ends of the horizontal timber members by fasteners inserted in the fastener holes. The hook brackets on the left ends of the horizontal beams have leftwardly extending hooks which engage the slots of one of the racks and the hook brackets on the right sides of the horizontal members have rightwardly extending hooks which engage the rack facing the left rack so as to maintain the horizontal members in a perpendicular attitude with respect to the vertical members.

It is an object of this invention to provide a hook bracket for adjustably mounting a horizontal timber member to a vertical rack.

It is also an object of this invention to provide a hardware kit for assembling a frame structure from standard size lumber.

It is a further object of this invention to provide a sturdy adjustable shelf structure.

Other objects, features, and advantages of the present invention will be apparent from the following specification when taken in conjunction with the accompanying drawings.

DESCRIPTION OF THE PREFERRED EMBODIMENT

Figure 4:
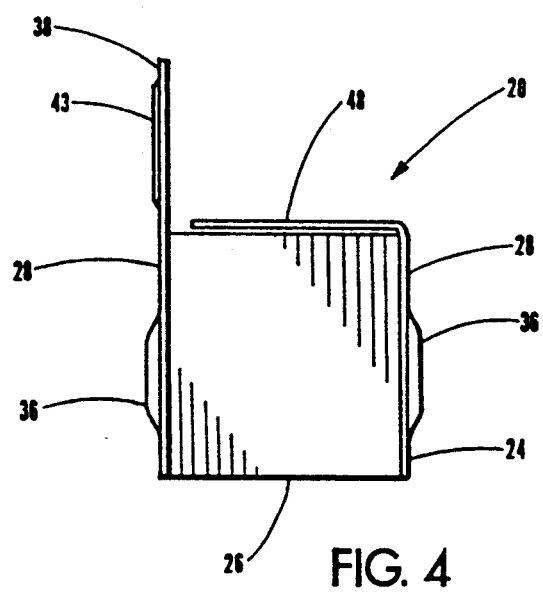
FIG. 4 is a top view of the hook bracket of FIG. 2.
Figure 5:
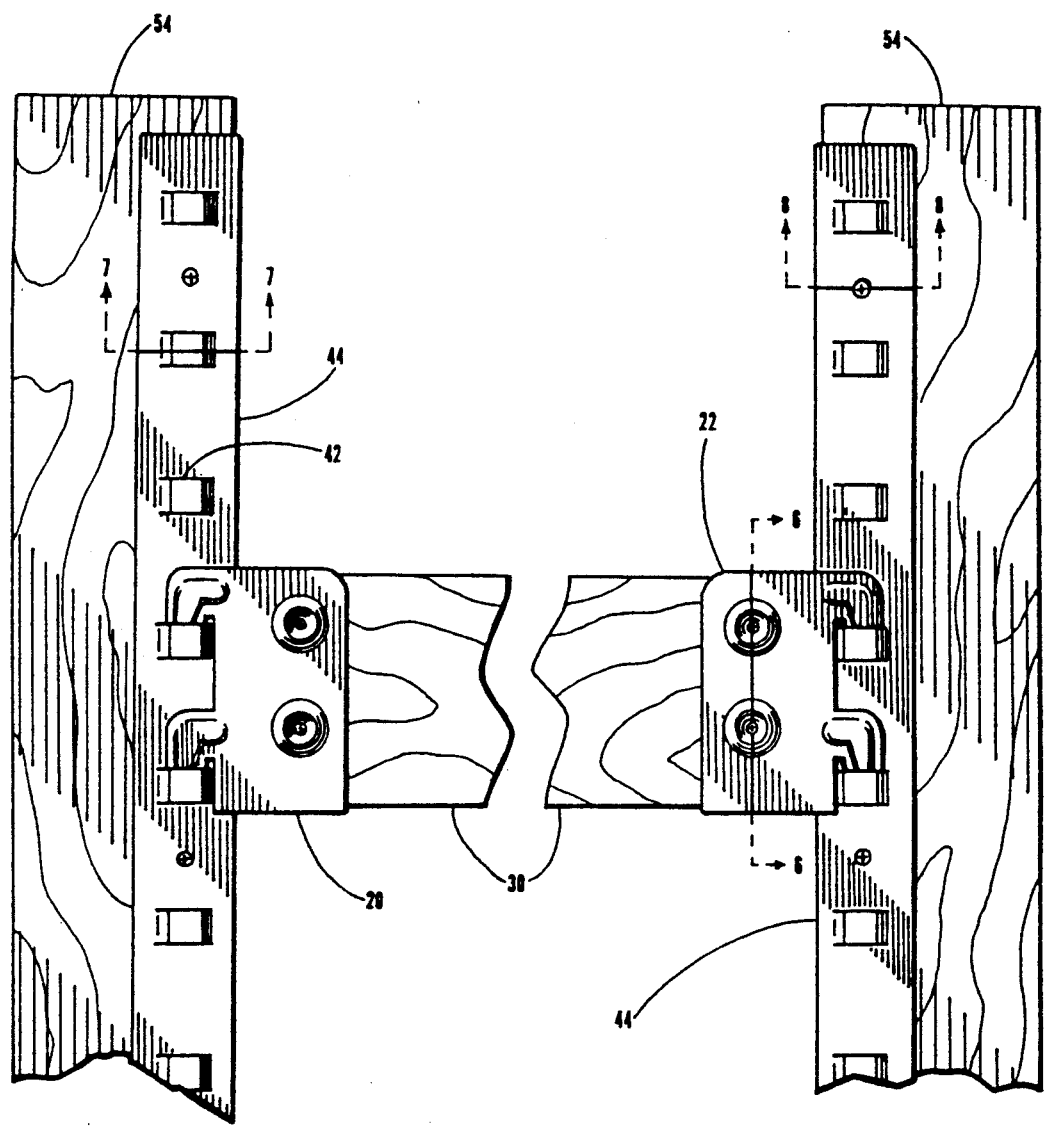
FIG. 5 is a fragmentary front elevational view of an assembled support structure of this invention.
Figure 6:
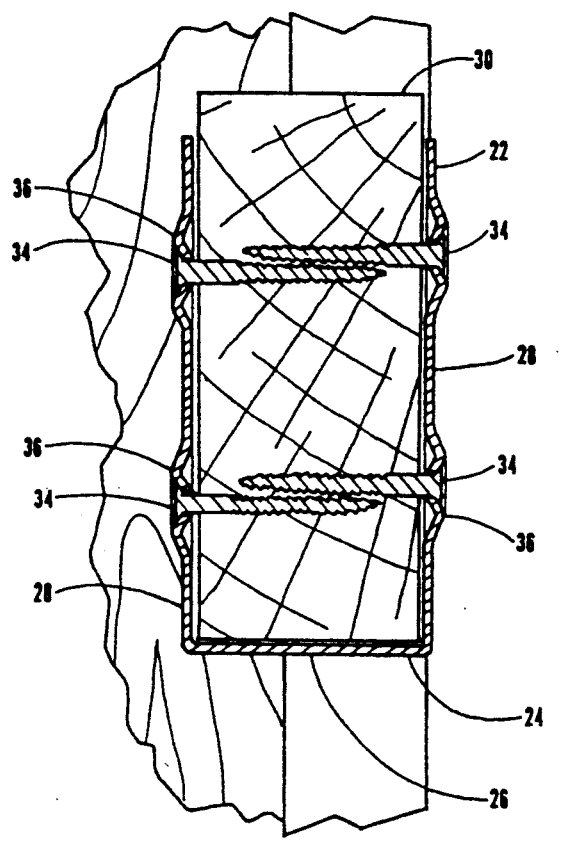
FIG. 6 is a cross-sectional view of the hook bracket of this fastened to a horizontal timber taken along section line 6—6 of FIG. 5.

Referring more particularly to FIGS. 1–10 wherein like numbers refer to similar parts, a left hook bracket 20 is shown in FIGS. 1-5. The right hook bracket 22 is a mirror image of the left hook bracket 20 and is identical in all other respects. The hook brackets 20, 22 are metal, and are preferably formed from a single sheet of material such as 18 gauge galvanized steel. The sheet metal hook brackets 20, 22 have a U-shaped band 24 with a horizontal base 26 which joins two upwardly extending vertical arms 28. The arms 28 of the band 24 are sufficiently far apart to snugly accept a standard sized horizontal timber member 30 which will preferably be a commercially available 2×4 timber. Each arm 28 of the band 24 has at least one and preferably two fastener holes 32. The fastener holes 32 on each arm 28 are vertically spaced one above the other. Tee fastener holes 32 are adapted to permit the insertion of fasteners 34 which may be nails or preferably self-drilling screws. To avoid projecting screw heads, each fastener hole may be surrounded by a projecting crown 36, with the depressed center of the crown 36 forming the fastener hole 32 as best shown in FIG. 6. The fastener holes 32 are placed on each arm 28 and staggered as best shown in FIG. 6 such that a fastener 34 when inserted through one hole 32 parallel to the base 26 will not directly oppose any other fastener.

One or preferably two L-shaped hooks 38 extend outwardly from one arm 28 and are in substantially the same plane as the arm.

Each hook 38 has a downwardly extending engaging portion 40 which is adapted to engage in a slot 42 formed in a vertically mounted rack 44. The slots 42 are formed in the rack 44 by metal bands 46 which protrude from the rack. The racks have depressed fastener holes 45 for attaching the rack to a vertical timber or 2×4 54. The engaging portions 40 are tapered so that they may be wedged in the slots 42. Protrusions 43 are formed in the engaging portions 40 to create a thicker area to wedge within the slot 42.

Figures 2, 3:
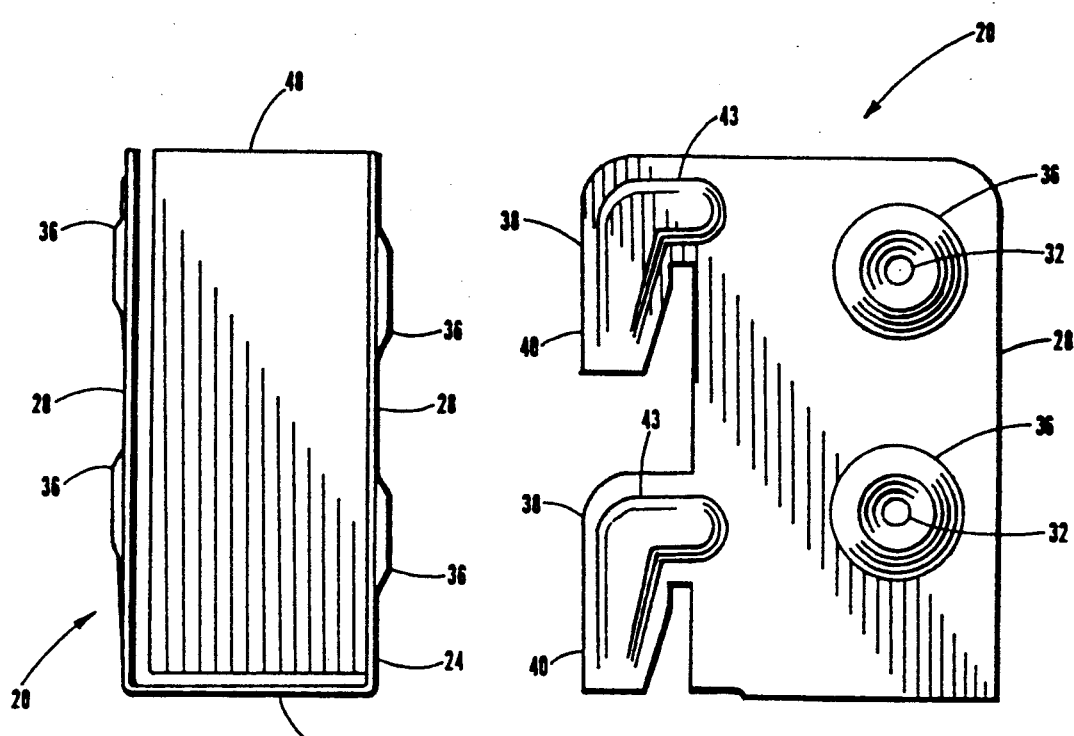
FIG. 2 is a side elevational view of a left hook bracket of this invention.
FIG. 3 is a front view of the hook bracket of FIG. 2.

Each hook bracket 20, 22 is preferably provided with an end plate 48 as best seen in FIGS. 3 and 4. The end plate is attached to the vertical arm 28 of the U-shaped band 24 opposite the hooks 38. The end plates 48 act as positioning guides when the horizontal 2×4s 30 are positioned within the hook brackets 20, 22. By abutting the horizontal 2×4 30 against the end plate 48 each hook bracket 20, 22 may be accurately positioned with respect to the end of the horizontal 2×4 30.

Figure 1:
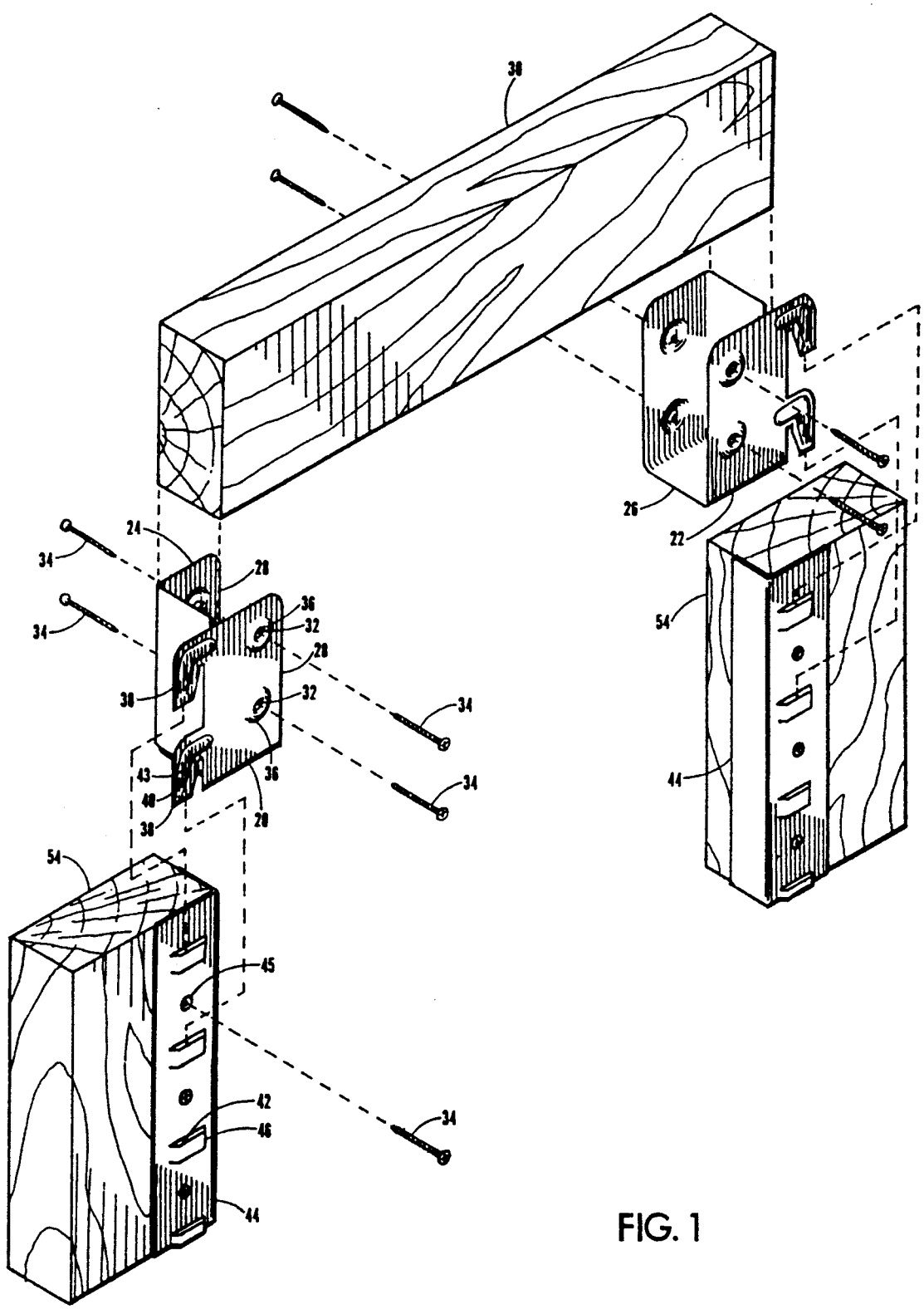
FIG. 1 is an exploded isometric view of the hardware kit of this invention in conjunction with a horizontal and two vertical timber members.

As shown in FIGS. 1 and 5 a horizontal 2×4 30 may be securely and adjustably attached to two vertically mounted racks 44 by attaching a left hook bracket 20 to the left side of the horizontal 2×4 30 and attaching a right hook bracket 22 to the right side of the horizontal 2×4 30. The fasteners 34 are inserted through the fastener holes 32 in the hook brackets 20, 22 as shown in section in FIG. 6. The hooks 38 of the hook brackets 20, 22 are then inserted within the slots 42 of the racks 44 at a selected height.

Figure 7:
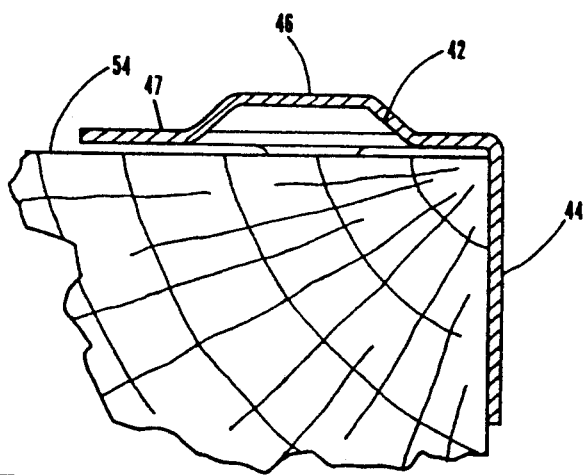
FIG. 7 is a cross-sectional view of the L-shaped rack of this invention taken along section line 7—7 of FIG.5.
Figure 8:
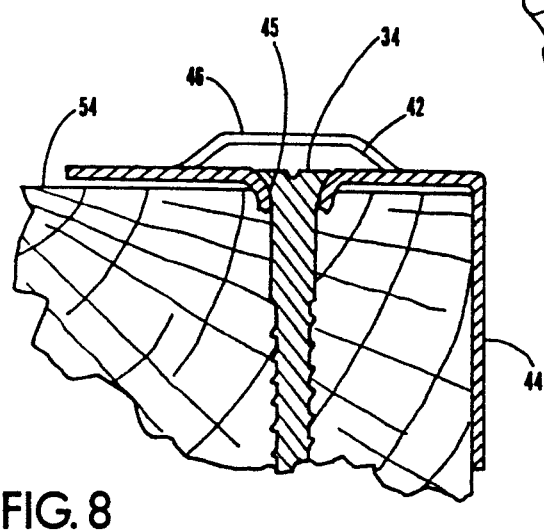
FIG. 8 is a cross-sectional view of the L-shaped of this in taken along section lines 8—8 of FIG. 5.

The vertical L-shaped racks 44 as shown in FIGS. 7 and 8 are attached to the vertical 2×4s by means of fasteners 34 inserted through fastener holes 45 in the rack 44. The rack has slots 42 formed by bands 46 which protrude out from one planar face 47 of the L-shaped racks 44.

Figure 9:
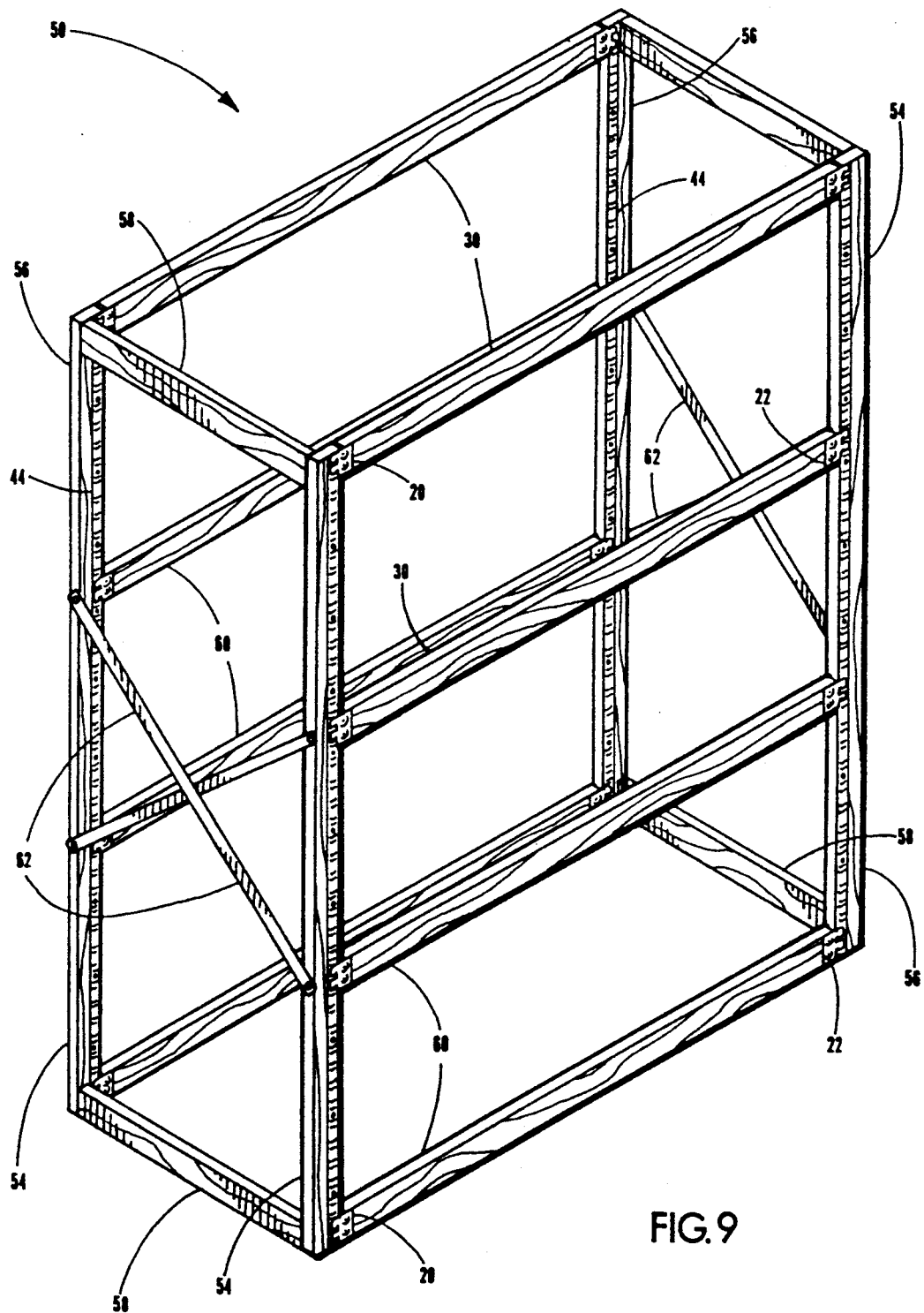
FIG. 9 is an isometric view of a shelf support structure utilizing the hardware kit of this invention.
Figure 10:
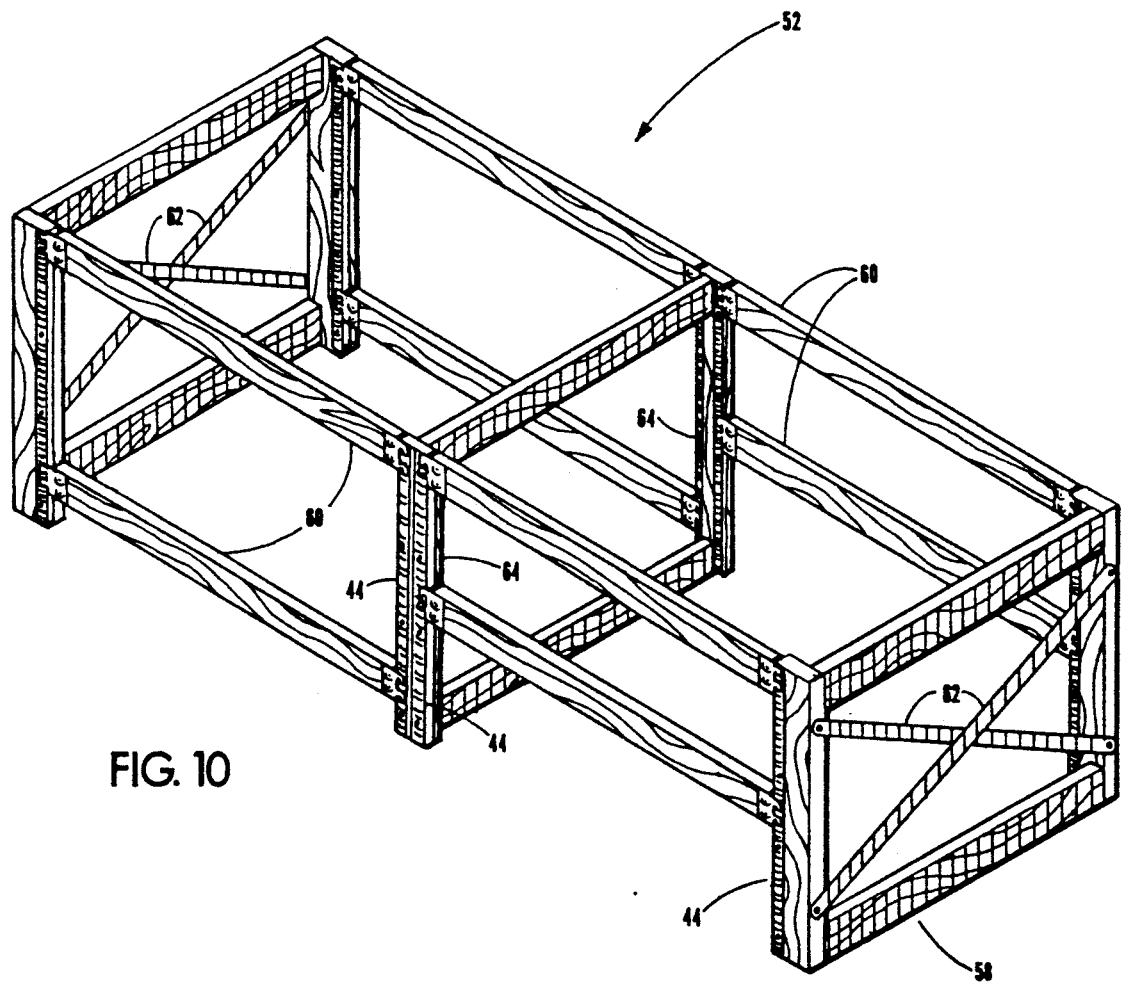
FIG. 10 is an isometric view of a support bench structure utilizing the hardware kit of this invention.

The hook brackets and racks may be used to construct frame structures of a variety of designs. A shelf structure 50 is shown in FIG. 9 and a bench structure 52 is shown in FIG. 10. The shelf structure 50 of FIG. 9 is constructed by assembling four upright 2×4s 54 into two side frames 56 by nailing brace beams 58 between each pair of upright 2×4s at the top and the bottom of each side frame 56. The beams 58 may be metal plates but are preferably wooden 2×4s as shown. The racks are mounted on the upright 2×4s 54 to form two pairs of racks whose slots face each other. Left and right hook brackets 20, 22 are fastened to the horizontal 2×4s 30 to form hooked timbers 60. Hooked timbers 60 are inserted in the slots 42 of the racks 44 at the same level on each of the four upright 2×4s 54, beginning with a set of hook timbers 60 positioned at the bottom of the shelf structure 50 and ending with a set of hooked timbers 60 at the top of the shelf structure. Pairs of hooked timbers 60 may be positioned at any desired level along the rack to form supports for a shelf (not shown) which may be laid over the pair of hooked timbers 60. To provide additional stiffness to the structure, and to resist shear loads metallic cross members 62 may be attached to the side frames 56 between two upright 2×4s 54.

The bench structure 52 of FIG. 10 may be constructed in the similar manner. The horizontal brace beams 158 in the bench 52 are shown formed from standard wooden 2×4s. A greater length of horizontal 2×4 may be achieved by abutting two hooked timbers 60 to an upright 2×4s 64 which has two racks 44 mounted on it.

A kit for assembly into a frame support structure would contain at least two racks 44 and a left hook bracket 20 and a right hook bracket 22. Cross members 60 and brace beams 58 might also be included in such a kit. By using one or more kits a builder may construct from standard sized 2×4s a wide variety of structures.

It is understood that the invention is not confined to the particular construction and arrangement of parts herein illustrated and described, but embraces such modified forms thereof as come within the scope of the following claims.

I claim:

1. A kit for constructing a free standing adjustable frame structure from standard dimensioned timber members, comprising:

a) at least four sheet metal L-shaped racks, each L-shaped rack having a first planar leg and a second leg which extends from the first leg, the second leg having a planar face with a plurality of vertically spaced slots, the racks being adapted to being connected by fasteners to standard dimensioned timbers to support the racks in a vertical upright position, wherein the first leg is adapted to lie adjacent to a first upright timber surface, and the second leg is adapted to be positioned by the first leg adjacent to an upright timber surface perpendicular to the first upright timber surface;

b) at least four sheet metal hook brackets, each bracket having portions defining a fastener opening to permit mounting to the ends of standard dimensioned horizontal timers, each bracket having portions forming at least one hook for engagement with the vertically spaced slots of the L-shaped racks wherein the hook brackets are adapted to be attached to opposite ends of horizontally disposed timber members and to join said horizontal timber members to the vertical timbers, wherein each bracket has an end plate which is adapted to abut the rack first leg and wherein the slots are positioned with respect to the first leg such that the hooks may engage within the slots, and wherein the sheet metal hook brackets each have a U-shaped band having two vertical arms adapted to be fastened to and to lie along opposed parallel surfaces of a standard dimensioned horizontal timber member, the arms being joined by a horizontal base for underlying a lower surface of the timber member.

2. The kit of claim 1 wherein the two vertical arms have at least two opposed and offset fastener holes which are adapted to allow the passage of fasteners for attachment of the hook bracket to a standard dimensioned timber.

3. A kit for constructing a free standing adjustable frame structure from standard dimensioned timber members, comprising:
  a) at least four sheet metal L-shaped racks, each L-shaped rack having a first planar leg and a second leg which extends from the first leg, the second leg having a planar face with a plurality of vertically spaced slots, the racks being adapted to being connected by fasteners to standard dimensioned timbers to support the racks in a vertical upright position, wherein the first leg is adapted to lie adjacent to a first upright timber surface, and the second leg is adapted to be positioned by the first leg adjacent to an upright timber surface perpendicular to the first upright timber surface;
  b) at least four sheet metal hook brackets, each bracket having portions defining a fastener opening to permit mounting to the ends of standard dimensioned horizontal timbers, each bracket having portions forming at least one hook for engagement with the vertically spaced slots of the L-shaped racks wherein the hook brackets are adapted to be attached to opposite ends of horizontally disposed timber members and to join said horizontal timber members to the vertical timbers, wherein each bracket has an end plate which is adapted to abut the rack first leg and wherein the slots are positioned with respect to the first leg such that the hooks may engage within the slots;
  c) a plurality of horizontal timber members joined to the hook brackets by a plurality of fasteners; and
  d) four vertical timbers defining four corners of a structure, connected to the racks, the horizontal timbers and the attached hook brackets being joined to the racks by means of the hooks so forming an adjustable frame structure.

4. A kit for constructing a free standing adjustable frame structure from standard dimensioned timber members, comprising:
  a) at least four sheet metal L-shaped racks, each L-shaped rack having a first planar leg and a second leg which extends from the first leg, the second leg having a planar face with a plurality of vertically spaced slots, the racks being adapted to being connected by fasteners to standard dimensioned timbers to support the racks in a vertical upright position, wherein the first leg is adapted to lie adjacent to a first upright timber surface, and the second leg is adapted to be positioned by the first leg adjacent to an upright timber surface perpendicular to the first upright timber surface;
  b) at least four sheet metal hook brackets, each bracket having portions defining a fastener opening to permit mounting to the ends of standard dimensioned horizontal timbers, each bracket having portions forming at least one hook for engagement with the vertically spaced slots of the L-shaped racks wherein the hook brackets are adapted to be attached to opposite ends of horizontally disposed timber members and to join said horizontal timber members to the vertical timbers, wherein each bracket has an end plate which is adapted to abut the rack first leg and wherein the slots are positioned with respect to the first leg such that the hooks may engage within the slots, wherein the hook brackets have upwardly extending vertical arms which snugly accept the horizontal member, and wherein said bracket fastener openings are defined by portions of said arms and wherein each arm has projecting crowns with a raised outer edge and a depressed center surrounding each said fastener opening.

5. A shelf support structure constructed of standard dimensioned timber 2×4 members comprising:
  a) at least four vertical 2×4s arrayed in a rectangular pattern, each vertical 2×4 having four faces which intersect to define four corners;
  b) an L-shaped rack mounted to each vertical 2×4, each rack having a first planar face with portions defining a plurality of vertically spaced slots, and a second planar face extending from the first planar face, wherein the rack faces overlie the corners of the vertical 2×4s;
  c) means for fastening the racks to the vertical 2×4 members;
  d) at least two pairs of horizontal 2×4s, each horizontal 2×4 of each pair having a first end and a second end and each pair of horizontal 2×4s defining a horizontal plane adapted to support a horizontal shelf, each horizontal 2×4 extending between vertical 2×4s on opposite sides of the rectangle defined by the four vertical 2×4s;
  e) At least eight sheet metal hook brackets, wherein each bracket has a U-shaped band with two vertical arms which are fastened to and which lie along opposed parallel surfaces of the horizontal 2×4s, and wherein the arms are joined by a horizontal base which underlies a horizontal 2×4 in supporting relation, and wherein each arm has portions defining one or more fastener openings, each bracket having at least one L-shaped hook extending outwardly and downwardly in approximately the plane of one of the parallel surfaces of the horizontal timber members and one of the vertical surfaces of the vertical 2×4s, wherein each hook is engaged on one of the spaced slots in the racks, to support the timber members in fixed relation to the vertical 2×4s; and a plurality of fasteners which penetrate the fastener openings of the hook bracket, the fasteners rigidly attaching the hook brackets to the horizontal 2×4s.

6. The structure of claim 5 further comprising a plurality of wooden brace beams for connecting the vertical timber members horizontally and substantially perpendicular to the connections formed by the hook brackets together with the horizontal timber members.

7. The structure of claim 5 further comprising a plurality of metal cross braces for bracing standard dimensional timber members to resist shear loads in the structure.

8. The kit of claim 5 wherein each hook bracket has a plurality of said L-shaped hooks extending from one of said arms in vertical spaced relationship.

9. A kit for adjustably joining four sided rectangular standard dimensioned timbers into a free standing shelving unit comprising:
  a) at least four linearly extending L-shaped racks, each rack having a planar face with a plurality of outwardly protruding bands which define slots along the rack's vertical length, the rack being adapted to lie along two sides of a vertically portioned standard dimensioned timber and adapted to be rigidly attached thereto; and
  b) at least four brackets, each set of two hook brackets being adapted to be rigidly mounted to opposed ends of a horizontal standard dimensioned timber, the hook brackets having portions which form at least one downwardly extending hook which is adapted to extend beyond the ends of a standard dimensioned timber and to engage with the slots of the racks to from an adjustable shelving unit, wherein the hook brackets are further comprised of a U-shaped band having two vertical arms adapted to be fastened to and lie along opposed sides of a horizontal standard dimensional timber, the arms being joined by a horizontal base adapted to underlie a lower side of the horizontal standard dimensional timber.

10. The kit of claim 9 wherein the hooks of the hook brackets are L-shaped and extend outwardly and downwardly from one arm of the hook brackets in the same plane as the arm.

11. The kit of claim 10 wherein the hook of the hook bracket has a tapered protrusion from the plane of the arm and wherein the hook is tapered in the plane of the arm so that the hook is easily inserted into the slots of the rack and when inserted, wedges tightly therein.

12. A structural frame comprising:
 a) four upright timber members having multiple planar surfaces which are positioned at the corners of a rectangle;
 b) four L-shaped racks each having a planar face with portions defining a plurality of vertically spaced slots, and having portions defining fastener holes, each rack being singly mounted on one of the upright timber members with the face of the rack defining the slots being secured against a planar surface of the timber member on which it is mounted, wherein fasteners penetrate the rack through said rack fastener holes;
 c) two horizontal timber members having multiple planar surfaces and left and right ends; and
 d) four sheet metal brackets, each bracket having a U-shaped band with two vertical arms fastened to and lying along opposed surfaces of an end of a said horizontal timber member, the arms being joined by a horizontal base underlying a lower surface of the said timber member, each arm having portions defining a fastener hole to permit rigid fastening of the timber member within the arms of the bracket, at least one L-shaped hook extending outwardly and downwardly from one arm and in substantially the same plane as the arm wherein the hook is engaged within one of the slots in one of the racks, the brackets each being singly mounted to an end of one of the horizontal timber members wherein fasteners are inserted in said bracket arm fastener holes, wherein each hook extending from each bracket mounted to said left end of one of said horizontal members is leftwardly extending and each hook extending from each bracket mounted to said right end of a horizontal member is rightwardly extending, each hook of each bracket being engaged in a selected one of said slots of one of said racks on one of said upright timber members to support each horizontal timber member on two of the upright timber members in perpendicular relation thereto, each of the engaged hooks extending parallel to the planar face of the rack in which it is engaged and between the rack planar face and said portions which define on of said rack slots.

* * * * *